United States Patent [19]

Biale

[11] Patent Number: 5,182,327
[45] Date of Patent: Jan. 26, 1993

[54] HIGH-GLOSS LATEX PAINTS AND POLYMERS FOR USE THEREIN

[75] Inventor: John Biale, Anaheim, Calif.

[73] Assignee: Rohm and Haas Company, Philadelphia, Pa.

[21] Appl. No.: 628,712

[22] Filed: Dec. 17, 1990

Related U.S. Application Data

[63] Continuation-in-part of Ser. No. 278,248, Nov. 30, 1988, abandoned.

[51] Int. Cl.$^5$ .................. C08L 31/02; C08L 31/04
[52] U.S. Cl. .................... 524/556; 524/560; 524/565; 524/460
[58] Field of Search ........... 524/565, 457, 556, 560, 524/460; 526/318.44, 318.4

[56] References Cited

U.S. PATENT DOCUMENTS

| | | | |
|---|---|---|---|
| 3,297,612 | 1/1967 | Lee et al. | 526/318.44 |
| 3,297,612 | 1/1967 | Lee et al. | 526/318.44 |
| 3,714,106 | 1/1973 | Smith et al. | 524/547 |
| 4,246,387 | 1/1981 | Deutch | 526/318.44 |
| 4,248,387 | 1/1981 | Deutsch | 526/318.44 |
| 4,341,679 | 7/1982 | Burgess et al. | 526/318.4 |

OTHER PUBLICATIONS

Simpson, *Progress in Organic Coatings*, 6:1-30 (1978).
Warson, *Gloss Emulsion Paints*, 2nd Ed., Solihull Chemical Services, West Midlands, England (1983).

*Primary Examiner*—Joseph L. Schofer
*Assistant Examiner*—Jeffrey T. Smith

[57] ABSTRACT

A polymer having an average molecular weight of less than about 150,000 and comprising about 3 to about 20 weight percent olefinic carboxylic acid and 80 to about 97 weight percent nonionic monomers is capable of enhancing (a) the gloss and (b) the flow and leveling characteristics of a latex paint.

18 Claims, 1 Drawing Sheet

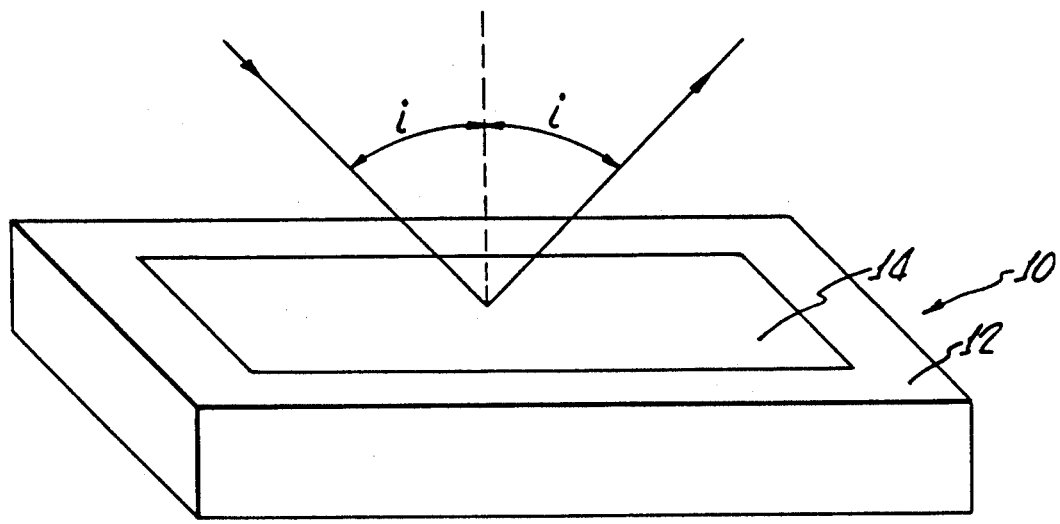

HIGH-GLOSS LATEX PAINTS AND POLYMERS FOR USE THEREIN

CROSS-REFERENCE TO RELATED APPLICATION

This application is a continuation-in-part of application Ser. No. 07/278,248, filed Nov. 30, 1988, now abandoned, which application is incorporated herein in its entirety by reference.

BACKGROUND

The present invention relates to (I) polymers capable of enhancing the (a) gloss and (b) flow and leveling of latex paints and (2) high-gloss latex paints.

Paints can be divided into three basic categories, namely, (1) flat paints having a specular gloss of less than about 15 percent reflectance, (2) semi-gloss paints having a specular gloss of about 35 to about 50 percent reflectance, and (3) high-gloss paints having a specular gloss greater than about 70 percent reflectance based upon light having about a 60° angle of incidence (i). Oil-base paints can easily be formulated into these three categories of paints. However, it is difficult to formulate latex paints having a high specular gloss. The inability to readily formulate high-gloss latex paints is a significant drawback since oil-base paints are being phased out due to environmental restrictions limiting the volatile organic compounds (VOC) content of paints.

In addition, latex paints are a mixture of a multitude of ingredients. Typical ingredients include coalescing aids, thickening aids (e.g., rheology modifiers), dispersing aids, defoamers, biocides, pigments, and binders. Rheology modifiers are employed to enhance latex paint flow and leveling characteristics. Flow and leveling is an indication of the ability of the paint to form a smooth surface devoid of brush marks upon application of the paint to a surface. However, the flow and leveling characteristics of a paint are not always significantly improved even when a rheology modifier is added to the latex paint.

SUMMARY OF THE INVENTION

The present invention provides polymers capable of enhancing both the gloss and the flow and leveling of latex paints. The polymers of the present invention have a weight average molecular weight of less than about 150,000 and comprise about 3 to about 20 weight percent olefinic carboxylic acid and about 80 to about 97 percent nonionic monomer. Typically and preferably, these polymers have a glass transition temperature ($T_g$ of about 0° to about 70° C. and a particle size of up to about 200 nanometers (nm). Preferably, a copolymerizable surfactant and a chain transfer agent are present in the polymers.

The invention also encompasses an emulsion comprising water and the above polymer. In addition, the invention encompasses a paint. The paint is of the type comprising (a) a coalescing aid, (b) a thickening aid, (c) a dispersing aid, (d) a defoamer, (e) a biocide, (f) a filler, and (g) a binder. At least a portion of the solid content of the binder is the aforementioned polymer When the paint is applied to a surface and dried, it forms a composition capable of having a specular gloss of at least about 70 percent reflectance. Furthermore, when at least a portion of the thickening aid employed in the paint is a rheology modifier, the paint generally has improved flow and leveling characteristics when compared to a paint containing substantially the same ingredients but devoid of the polymer.

A method for forming the polymer is also encompassed by the present invention. The method comprises the steps of (a) forming a monomer mixture comprising about 3 to about 20 weight percent olefinic carboxylic acid monomer and about 80 to about 97 weight percent nonionic monomer, (b) combining at least about 25 weight percent of the monomer mixture with water to form a reaction medium, (c) initiating the polymerization of the olefinic carboxylic acid and nonionic monomers, and (d) adding any remaining portion of the monomer mixture to the reaction medium.

A BRIEF DESCRIPTION OF THE DRAWING

The enhancement in the gloss and the flow and leveling characteristics the latex paints and other features, aspects, and advantages of the present invention will become better understood with reference to the following description, appended claims, and accompanying drawing where the sole figure is a perspective view of a substrate having a surface coated with a composition of the present invention.

As shown in the sole figure, the paint is applied to at least a portion of a surface 12 of a substrate 10. When applied to a substrate 10 having a white glossy surface 12, the paint, upon drying forms a composition 14 that typically has a specular gloss of at least about 70 percent reflectance when measured at an angle of incidence i of about 60°. A commercially available substrate having a white, glossy surface is Form WB grade plain white charts available from Leneta Company of Ho-Ho-Kus, N.J. Since specular gloss is directly proportional to the percent reflectance at a given angle of incidence i, it is preferred that the percent reflectance obtained by the composition 14 be at least about 75, more preferably at least about 80, even more preferably at least about 85, and optimally at least about 90 when measured at an angle of incidence i of about 60°. Accordingly, the polymer of the present invention is capable of enhancing the specular gloss of a paint.

DETAILED DESCRIPTION OF THE INVENTION

The present invention is directed to (a) a polymer for use in a high-gloss paint, (b) an emulsion comprising water and the polymer, (c) the paint, (d) a composition formed by drying the paint, (e) a substrate having a surface at least partially coated with the composition, and (f) a method for making the polymer. The polymer also improves the flow and leveling characteristics of the paint.

In accordance with the present invention, the polymer has a weight average molecular weight of less than about 150,000 and comprises about 3 to about 20 weight percent olefinic carboxylic acid and about 80 to about 97 weight percent nonionic monomer. As used in the specification and claims, the term "weight average molecular weight" means the weight average molecular weight of a polymer as determined by gel chromatography; and the term "weight percent," when employed in specifying the concentration of a monomer in a polymer, means the weight of that particular monomer employed in making the polymer divided by the total weight of all the monomers employed in making the polymer, the quotient being multiplied by 100%. While copolymerizable surfactants are monomers, throughout the specification and claims, the language "total weight of all monomers employed to make the polymer" excludes copolymerizable surfactants. Preferably, the polymer comprises about 5 to about 10, and more preferably about 7 to about 8, weight percent olefinic carboxylic acid.

In one version of the present invention, the olefinic carboxylic acid is a mono-olefinic carboxylic acid. Exemplary mono-olefinic carboxylic acids include, but are not limited to, acrylic acid, methacrylic acid, acryloxyacetic acid, methacryloxyacetic acid, acrylamidoglycolic acid, and mixtures thereof. The mono-olefinic carboxylic acid is preferably selected from the group consisting of acrylic acid, methacrylic acid, and mixtures thereof, and most preferably is acrylic acid.

In another version of the present invention, the olefinic carboxylic acid is a di-olefinic carboxylic acid. Exemplary di-olefinic carboxylic acids include, but are not limited to, itaconic acid, fumaric acid, and mixtures thereof.

The nonionic monomer constituent of the polymer is selected from the group consisting of non-functional nonionic monomers, functional nonionic monomers, and mixtures thereof. As used in the specification and claims, the term "functional nonionic monomers" means nonionic monomers that contain at least one group, e.g., hydroxyl, carboxyl, amide, and amine, that can undergo further reaction, and the term "non-functional nonionic monomers" means nonionic monomers that are devoid of even one group that can undergo further reaction.

Non-functional monomers include, but are not limited to, acrylonitrile, vinylidene halide monomers, alkenyl aromatic monomers, acrylic monomers having the formula I

and mixtures thereof. In formula I, supra, $R_1$ is selected from the group consisting of hydrogen and methyl and $R_2$ is an alkyl group, preferably having up to 6 carbon atoms. As used in the specification and claims, the term "alkyl" means cyclic and acyclic hydrocarbon groups that are either branched or unbranched. Exemplary acrylic monomers include, but are not limited to, methyl methacrylate, methyl acrylate, ethyl methacrylate, ethyl acrylate, butyl methacrylate, butyl acrylate, and mixtures thereof. Preferred acrylic monomers are selected from the group consisting of ethyl acrylate, methyl methacrylate, and mixtures thereof.

When the non-functional monomer used is vinylidene halide, the halide moiety is preferably selected from the group consisting of chlorine, bromine, and mixtures thereof. The preferred vinylidene halide monomer is vinylidene chloride.

Alkenyl aromatic monomers are any organic compound containing at least one aromatic ring and at least one aliphatic-containing moiety having alkenyl unsaturation. Preferred alkenyl aromatic monomers are represented by the formula II

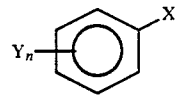

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Vinyl is the most preferred X.

Y is an organic or inorganic radical. As used throughout the specification and claims, the term "organic radical" means any group containing at least one carbon atom, and the term "inorganic radical" means any group devoid of even one carbon atom. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary substituents for Y include halo and cyano radicals and substituted and unsubstituted alkyl radicals of 1 to about 10 carbon atoms. Preferred Y substituents are chloride and unsubstituted alkyl groups of 1 to about 6 carbon atoms. Y is most preferably a chloride radical and $C_1$ to about $C_4$ unsubstituted alkyl radicals.

Illustrative alkenyl aromatic monomers include styrene, p-methyl styrene, o-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. Due to its commercial availability and low cost, styrene is the preferred alkenyl aromatic monomer.

The functional nonionic monomer is generally selected from the group consisting of hydroxyalkyl acrylates having the formula III

olefinically unsaturated monomers having the formula IV

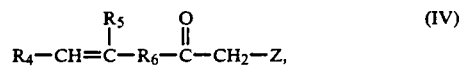

acrylamide monomers having the formula V

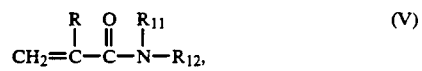

aminoalkyl acrylate monomers having the formula VI

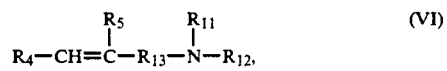

ethyleneureido-containing amines, and mixtures thereof.

In formula III, supra, $R_1$ is as defined above and $R_3$ is a hydroxyalkyl group, preferably comprising up to about 6 carbon atoms. More preferably, the hydroxyalkyl groups comprise up to about 3 carbon atoms. Typical hydroxyalkyl acrylates include, but are not limited to, hydroxyethyl acrylate, hydroxyethyl methacrylate, and mixtures thereof.

In formula IV, supra, $R_4$ is selected from the group consisting of hydrogen and halogen, $R_5$ is selected from the group consisting of hydrogen, halo, thio, and monovalent organic radicals, $R_6$ is a divalent organic or inorganic radical, and Z is selected from the group consisting of organoacyl and cyano. Generally, $R_5$ contains up to about 10 atoms other than hydrogen. Preferably, $R_4$ is hydrogen and $R_5$ is hydrogen and alkyl radicals having up to about 10 carbon atoms. $R_6$ is a heteroatom or contains heteroatoms, such as oxygen, sulfur, phosphorus, and nitrogen. The heteroatoms are preferably selected from the group consisting of oxygen, sulfur, and nitrogen. In addition, $R_6$ optionally contains functional groups such as carbonyls, carboxy-esters, thio, and amino substituents. Although $R_6$ also optionally comprises aromatic, olefinic, or alkynyl unsaturation, $R_6$ is preferably saturated. Preferably, $R_6$ is a cyclic or acyclic organic radical containing up to about 40 carbon atoms. Most preferably, $R_6$ is an acyclic radical containing up to about 20 atoms in length, with any and all side groups each being up to about 6 atoms in length. Because of commercial availability, Z preferably is organoacyl. Z generally has the formula VII

wherein $R_7$ is selected from the group consisting of hydrogen and monovalent organic radicals. Typically, $R_7$ contains up to about 10 atoms in addition to any hydrogen atoms present in the monovalent organic radical. Preferably, $R_7$ is hydrogen or an alkyl group containing up to about 7 carbon atoms. Methyl is the most preferred $R_7$.

A preferred olefinically unsaturated functional nonionic monomer has the formula VIII

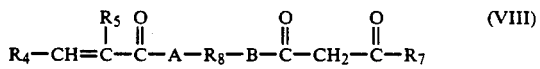

wherein $R_4$, $R_5$, and $R_7$ are as defined above, $R_8$ is a wherein divalent organic radical at least 2 atoms in length, and A and B are each independently selected from the group 1; consisting of O, S, and $NR_9$, with $R_9$ being selected from the group consisting of hydrogen and hydrocarbyl radicals containing up to about 6 carbon atoms. Preferably, $R_9$ is hydrogen or an alkyl group. Oxygen is preferred for A and B. Typically, $R_8$ contains up to about 40 atoms, but usually contains no more than about 20 atoms. $R_8$ can be cyclic or acyclic and can contain both cyclic and acyclic moieties. Exemplary cyclic $R_8$ groups include cycloalkylenes and phenylene. However, $R_8$ is preferably acyclic and is selected from the group consisting of substituted and unsubstituted alkylenes, polyoxyalkylenes, polythioalkylenes, and polyaminoalkylenes. Unsubstituted alkylenes are most preferred for $R_8$. Due to its commercial availability, a preferred olefinically unsaturated functional nonionic monomer of formula VIII is acetoacetoxyethyl methacrylate having the following formula IX:

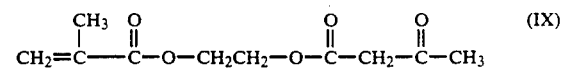

With respect to the acrylamide monomers of formula V, supra, $R_1$ is as discussed above and $R_{11}$ and $R_{12}$ are each independently selected from the group consisting of hydrogen and alkyl radicals containing up to about 2 carbon atoms. Preferred acrylamide monomers include acrylamide, methacrylamide, and mixtures thereof.

In the aminoalkyl acrylate monomers of formula VI, supra, $R_4$, $R_5$, $R_{11}$, and $R_{12}$ are as discussed above, and $R_{13}$ is a divalent alkyl radical containing 1 to about 5 carbon atoms. An exemplary aminoalkyl acrylate is dimethylaminoethyl methacrylate.

The olefinically unsaturated nonionic functional monomers of formula IV, supra, the aminoalkyl acrylate monomers of formula VI, supra, and the ethyleneureido-containing amines are capable of enhancing the wet adhesion strength of a paint incorporating the polymer. An exemplary ethyleneureido-containing amine is 1-[2-(3-allyloxy-2-hydroxypropyl-amino)ethyl]imidazolidin-2-one, commercially known as Sipomer WAM brand monomer by Alcolac.

Typically and preferably, the non-ionic monomer comprises a mixture of non-functional and functional monomers. In a preferred embodiment, the polymer comprises about 80 to about 90 weight percent non-functional nonionic monomers and up to about 10 weight percent functional nonionic monomers.

The polymer optionally comprises a copolymerizable surfactant. Exemplary copolymerizable surfactants include, but are not limited to, sulfoethyl methacrylate, vinylsulfonate salts, sulfopropyl methacrylate, styrene sulfonate salts, 2-acrylamido-2-methylpropanesulfonic acid salts, and mixtures thereof. Generally, the copolymerizable surfactant comprises up to about 5 weight percent of the polymers. As used in the specification and claims, the term "weight percent," when used to describe the concentration of a copolymerizable surfactant, means the weight of the copolymerizable surfactant employed to make the polymer divided by the total weight of all monomers employed to make the polymer, the quotient being multiplied by 100 percent. More typically, the copolymerizable surfactant comprises about 0.1 to about 5 weight percent of the polymer. Preferably, the polymer comprises about 0.5 to about 2 weight percent copolymerizable surfactant.

A chain transfer agent is also optionally present in the polymer. Exemplary chain transfer agents include aliphatic mercaptans, monothioglycerol, and mixtures thereof. Typical aliphatic mercaptans are represented by the formula $R_{10}$—S—H, wherein $R_{10}$ is an alkyl group, preferably containing about 6 to about 12 carbon atoms. Generally, the chain transfer agent comprises up to about 3 weight percent of the polymer. As used in the specification and claims, the term "weight percent," when used to describe the concentration of a chain transfer agent, means the weight of the chain transfer agent employed to make the polymer divided by the total weight of all monomers employed to make the polymer, the quotient being multiplied by 100 percent. More typically, the polymer comprises about 0.1 to about 3 weight percent change transfer agent. Preferably, the change transfer agent comprises about 1.5 to about 2.5 weight percent of the polymer.

The weight average molecular weight is an important physical characteristic of the polymer. Preferably, the weight average molecular weight of the polymer is less than about 125,000, more preferably less than about 100,000, most preferably less than about than about 70,000, and optimally less than about 60,000. The preferred weight average molecular weight range is about 15,000 to about 125,000, with about 20,000 to about 100,000 being more preferred, about 25,000 to about 70,000 being most preferred, and about 30,000 to about 60,000 being optimum.

Other polymer characteristics include average particle size and $T_g$. As used in the specification and claims, the term "average particle size" means the average maximum cross-sectional diameter of the particles as measured on a Brookhaven Instrument Corp. BI-90 brand particle sizer using a photon correlation spectroscopy technique. The average particle size of the polymer is important because it is capable of affecting the gloss of a paint incorporating the polymer. Generally, the polymer has an average particle size of up to about 200 nm and preferably up to about 150 nm. Usually, the polymer has an average particle size greater than about 75 nm. The polymer typically has a $T_g$ of about 0° to about 70° C.

The polymer of the present invention is preferably made by an emulsion polymerization process. In general, the emulsion polymerization procedure entails forming a monomer mixture comprising about 3 to about 20 weight percent olefinic carboxylic acid monomer and about 80 to about 97 weight percent nonionic monomer. The monomer mixture is added to a reactor containing water to form a reaction medium. Preferably, the reactor contains water, a surfactant, and a chain transfer agent.

The chain transfer agent is typically any of the above-mentioned chain transfer agents, but is preferably monothioglycerol. The surfactant is normally any of the above-mentioned copolymerizable surfactants or an anionic surfactant or a nonionic surfactant or a mixture thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

Prior to adding the monomer mixture to the reactor, the reactor is preferably purged with an inert gas, such as nitrogen, to remove substantially all oxygen from the reactor. It is also preferred that as much of the monomer mixture as possible be initially added to the reactor. Typically, at least about 25 weight percent, and preferably at least about 50 weight percent, of the monomer mixture is added to the reactor.

Next, polymerization of the olefinic carboxylic acid and nonionic monomers is initiated. Usually, polymerization is initiated by heating the reactor contents to a temperature at least capable of initiating the polymerization reaction. Generally, the reactor is heated to at least about 50° F., but preferably, to at least about 100° F. To further aid in initiating the polymerization reaction, it is preferred to add a catalyst and an activator to the reactor. Exemplary catalysts include, but are not limited to, t-butyl hydroperoxide, sodium persulfate, hydrogen peroxide, and mixtures thereof. The preferred catalyst is t-butyl hydroperoxide. Exemplary activators include, but are not limited to, sodium sulfoxylate formaldehyde, sodium bisulfide, sodium bisulfite, sodium metabisulfite, erythorbic acid, and mixtures thereof. The preferred activator is sodium sulfoxylate formaldehyde.

After initiating the polymerization reaction, any remaining portion of the monomer mixture is added to the reactor. The delay-added portion of the monomer mixture is preferably added to the reactor after the reactor has reached a temperature of at least about 120° F., preferably at least about 150° to about 155° F. After adding any delay-added monomer mixture, the reactor is maintained at about 150° to about 155° F. until substantially all the monomers have reacted. However, the reaction can also be carried out at temperatures up to about 185° F.

It is also preferred that the addition of any delay-added monomer mixture be accompanied by the addition of a supplemental catalyst and a supplemental activator. Exemplary supplemental catalysts include, but are not limited to, sodium persulfate, hydrogen peroxide, t-butyl hydroperoxide, and mixtures thereof. A preferred supplemental catalyst is sodium persulfate. Exemplary supplemental activators include, but are not limited to, sodium bisulfide, sodium bisulfite, sodium metabisulfite, erythorbic acid, sodium sulfoxylate formaldehyde, and mixtures thereof A preferred supplemental activator is sodium bisulfite.

The polymerization process yields an emulsion comprising the polymer and water. However, as indicated in the above described process, the emulsion optionally further comprises a surfactant, a chain transfer agent, catalysts, and activators.

The emulsion is used to replace a portion of the binder used in a water-base paint. A typical paint comprises a coalescing aid, a thickening aid, a dispersing aid, a defoamer, a biocide, a filler, and the binder. Coalescing aids, thickening aids, dispersing aids, defoamers, biocides, and fillers suitable for use in water-base paint are well known to those skilled in the art. For example, thickening aids include, but are not necessarily limited to, natural products (such as alginates, casein, gum karaya, locust bean gum, and gum tragacanth), modified natural products (such as cellulosics including methyl cellulose, hydroxyethyl cellulose, and hydroxypropylmethyl cellulose), totally synthetic thickeners (such as carboxyvinyl ether polymers, acrylic polymers, and maleic anhydride styrene copolymers), and rheology modifiers.

As used in the specification and claims, the term "rheology modifier" means a composition that tends to give a latex paint a more Newtonian behavior, i.e., tends to make the viscosity of a latex paint less dependant on the rate of shear. Associative thickeners are generally rheology modifiers. Exemplary associative thickeners are urethane block copolymers (such as those described by Schaller et al., *Resin Review*, 36(2): 19-26; as well as those described in U.S. Pat. Nos. 4,079,028 and 4,155,892) and hydrophobically modified hydroxyethylcellulose associative thickeners (such as those described by Shaw et al., Journal of Coatings Technology, 57(727): 63–72 (Aug. 1985) as well as in U.S. Pat. No. 4,228,227), the foregoing publications being incorporated herein in their entirety by reference. Commercially available urethane block copolymers include Rohm and Haas Acrysol RM-5 and RM-825 as well as Acrysol Rheology Modifiers QR-708, QR-735, and QR-I001; and Union Carbide Corporation SCT-200 and SCT-275. Aqualon brand associative thickeners are hydrophobically modified hydroxyethylcellulose associative thickeners available from Hercules, Inc. The preferred associative thickeners are Acrysol RM-5 and RM-825.

Exemplary binders include, but are not limited to, vinyl acrylic polymers, acrylic polymers, vinyl chloride acrylic polymers, styrene/butadiene copolymers, styrene/acrylate copolymers, and vinyl acetate/ethylene copolymers. Generally, up to about 30 weight percent of the solid content of the binder is replaced by the polymer. Usually, the polymer replaces about 1 to about 30 weight percent of the binder's solid content. Preferably, from about 5 to about 25, more preferably from about 7 to about 20, and most preferably about 8 to about 15, weight percent of the solid content of the binder is replaced by the polymer.

Paints suitable for use in conjunction with the polymer typically have a pigment volume concentration (pvc) of less than about 30 volume by volume percent (v/v%). Preferably, the paint has a pvc of about 15 to about 25 v/v%.

In addition, some paints containing a rheology modifier and having a portion of their binder replaced by the polymer of the present invention exhibit significantly better flow and leveling characteristics than a corresponding paint whose sole significant difference is the substantial absence of the polymer of the present invention. There are many techniques for measuring flow and leveling characteristics. One such technique is the string relaxation method which entails using a Wells-Brookfield Cone/Plate Model LVT Viscometer (available from Brookfield Engineering Laboratories, Inc.) to measure the relaxation response of the paint. The higher the relaxation response, the easier the paint flows out when applied to a surface; and the easier the paint flows out when applied to a surface, the better the flow and leveling characteristics of the paint. Typically, latex paints incorporating a rheology modifier and the polymer of the present invention are capable of exhibiting a relaxation response at least about twice as great as a paint containing the same ingredients but substantially devoid of the polymer. Preferably, paints containing the polymer achieve a relaxation response of at least about five times, and more preferably of at least about ten times, greater than a similar paint whose sole significant difference is the substantial absence therefrom of the polymer of the present invention. In terms of percent drop in relaxation response as measured with a Wells-Brookfield Cone/Plate Model LVT viscometer, latex paints incorporating a rheology modifier and the polymer of the present invention are capable of achieving a percent drop in relaxation response of at least about 40, preferably at least about 50, more preferably at least about 60, and even greater than about 70.

EXAMPLES

The following examples demonstrate the manufacture of several exemplary polymers within the scope of this invention as well as the specular gloss and/or flow and leveling characteristics obtained by incorporating these polymers into a paint. In addition, one example also demonstrates the manufacture of a polymer that enhances wet adhesion as well as the specular gloss of a paint. However, the invention is not to be limited to the examples, the invention being defined by the claims.

EXAMPLES 1-7

Materials

In each of Examples 1-7, a charge and a monomer mixture was prepared having the formulations set forth in the following Table I:

TABLE I

| Ingredients | Examples | | | | | | |
|---|---|---|---|---|---|---|---|
| Charge | 1 | 2 | 3 | 4 | 5 | 6 | 7 |
| Water, g | 320 | 320 | 320 | 320 | 320 | 320 | 320 |
| Ammonium salt of sulfated alkylphenol ethoxylate (30% active)[1], g | 8.3 | 8.3 | 8.3 | 8.3 | 8.3 | 8.3 | 8.3 |
| Sulfoethyl methacrylate, g | 1.5 | 1.5 | 1.5 | 1.5 | 1.5 | 1.5 | 1.5 |
| Monothiolglycerol, g | 2.25 | 2.25 | 2.25 | 2.25 | 2.25 | 2.25 | 2.25 |
| Monomer Mixture | | | | | | | |
| Ethyl acrylate, g | 89 | 64 | 89 | 89 | 89 | 64 | 39 |
| Methyl methacrylate, g | 38.5 | 63.5 | — | — | — | — | 65 |
| Acrylic acid, g | 15 | 15 | 15 | 15 | 15 | 15 | 15 |
| Hydroxyethyl acrylate, g | 7.5 | 7.5 | 7.5 | 7.5 | 7.5 | 7.5 | 7.5 |
| Styrene, g | — | — | 38.5 | — | — | — | — |
| Acrylonitrile, g | — | — | — | 38.5 | — | — | — |
| Vinylidene chloride, g | — | — | — | — | 38.5 | — | — |
| Vinyl acetate, g | — | — | — | — | — | 63.5 | — |
| Acetoacetoxyethyl methacrylate, g | — | — | — | — | — | — | 26 |
| Average Particle Size, nm | 143 | 117 | 135 | 115 | 97 | 129 | 149 |
| Total solids, wt. % | 30.8 | 30.8 | 30.4 | 30.3 | 29.5 | 26.2 | 29.8 |

[1] An anionic surfactant available from GAF Corporation under the trademark Alipal EP120.

Procedure

The following procedure was used in each of Examples 1-7. A charge of a composition identified in Table I above was added to a reactor. The charged reactor was purged with nitrogen to remove substantially all traces of oxygen from the reactor. After purging the reactor, the entire monomer mixture was combined at room temperature with the charge in the reactor. Next, the reactor was heated and, when the reactor reached about 100° F., an activator (about 0.2 g sodium sulfoxylate formaldehyde dissolved in about 5 g water) and a catalyst (about 0.5 g t-butyl hydroperoxide) were added to the reactor. The reaction exhibited an immediate exotherm. At about 150° F., a supplemental activator (about 0.5 g sodium metabisulfite in about 10 ml water) and a supplemental catalyst (about 1 g sodium persulfate in about 10 ml water) were slowly delay added. After delay adding the supplemental activator and the supplemental catalyst, the temperature of the reaction was maintained at about 150° F. for about 30 minutes and then cooled. Each of the resulting emulsions had a total solid content and contained polymers having an average particle size as set for in Table I, above.

Gloss Determination

The effect of each polymer of Examples 1-7 on the gloss of a paint was determined as follows. As shown in Table II, infra, a portion (about 15 weight percent) 30 of the solid content of a commercially available binder (UNOCAL's 76 RES 3077 brand vinyl acrylic binder) was replaced with one of the polymers of Examples 1–7. The resulting binder was used in a water-base paint formulation having about a 20 v/v% pvc. A wet coating (about 6 mil) of the paint was applied to a Form WB grade plain white chart (available from Leneta Company, Ho-Ho-Kus, N.J.) and air dried in a constant temperature and constant humidity room for at least about 3 days. The specular gloss of each coating was measured using a 60° gloss meter and the results are set forth in the following Table II:

TABLE II

| Binder | | |
|---|---|---|
| 15 wt % Solids Derived from Polymer of Example | RES 3077, Percent Solids | Gloss, Percent Reflectance |
| — | 100 (Control) | 68.0 |
| 1 | 85 | 81.8 |
| 2 | 85 | 83.0 |
| 3 | 85 | 82.7 |
| 4 | 85 | 78.6 |
| 5 | 85 | 78.5 |
| 6 | 85 | 79.9 |
| 7[2] | 85 | N/A[1] |
| 8 | 85 | 89 |

[1]N/A denotes not available

The data for Examples 1–6 in Table II demonstrate that polymers within the scope of the present invention are capable of enhancing the gloss of a water-base paint. Although not quantitatively determined, the gloss of paint obtained using the polymer of Example 7 also improved with respect to the gloss of the control. In addition, the paint obtained using the polymer of Example 7 exhibited improved wet adhesion with respect to the control.

EXAMPLE 8

Procedure

A 20-gallon reactor was charged with water (about 34,200 g), GAF Corporation's Alipal EP120 brand anionic surfactant (about 929.6 g), sulfoethyl methacrylate (about 168 g), and monothioglycerol (about 336 g). The charged reactor was purged with nitrogen. Approximately half (about 8392 g) of the total monomer mixture to be polymerized was then added at room temperature to the reactor. The total monomer mixture to be polymerized comprised about 10,369 g methyl methacrylate, about 4,536 g ethyl acrylate, about 840 g acrylic acid, and about 840 g hydroxyethyl acrylate. Next, the reactor was heated and at about 100° F. a catalyst (about 28 g t-butyl hydroperoxide) and an activator (about 11.2 g sodium sulfoxylate formaldehyde) were added to the heated reactor. An exotherm ensued and at about 155° F. the delay add of a supplemental catalyst (about 112 g sodium persulfate in about 1620 g water), a supplemental activator (about 56 g sodium bisulfite), and the remaining portion of the monomer mixture was commenced. The remaining portion of the monomer mixture was slowly delay added over a period of about 2 hours and the supplemental catalyst and the supplemental activator were slowly delay added over a period of about 2.3 hours. The reaction was run at about 155° F. and, about 45 minutes after finishing the addition of all the delay added materials, the reactor was allowed to cool. The final emulsion contained about 29.7 percent solids, had a viscosity of about 10 centipoise (cps) and a pH of about 1.77, contained about 29 ppm grit on a 100 mesh screen and about 31 ppm on a 250 mesh screen, and contained a polymer having an average particle size of about 100 nm and a weight average molecular weight of about 58,600.

Gloss Determination

The effect of the polymer of Example 8 on the gloss of a paint was determined by the methodology set forth in the Gloss Determination section of Examples 1–7, supra. The results are set forth in Table II above. The data for Example 8 further substantiates that polymers within the scope of the present invention are capable of enhancing the gloss of a water-base paint.

EXAMPLE 9

Procedure

A 2.5-gallon reactor was charged with water about 2,500 g), GAF Corporation's Alipal EP120 brand (about 2, anionic surfactant (about 66.4 g), sulfoethyl methacrylate (about 12 g), and monothioglycerol (about 36 g). The charged reactor was purged with nitrogen. Approximately half (about 600 g) of the total monomer mixture to be polymerized was then added at room temperature to the reactor. The total monomer mixture to be polymerized comprised ethyl acrylate (about 306 g), methyl methacrylate (about 714 g), acrylic acid (about 120 g), and 2-hydroxyethyl acrylate (about 60 g). Next, the reactor was heated and at about 100° F. about 0.8 g of sodium sulfoxylate formaldehyde in about 40 ml water and a catalyst (about 2 g t-butyl hydroperoxide) were added to the heated reactor. When the reactor reached about 135° F., the delay addition of a catalyst (about 8 g sodium persulfate in about 80 ml water), an activator (about 4 g sodium persulfate in about 80 g water), and the remaining portion of the monomer mixture to the reactor was commenced. The delay addition period lasted about one hour, during which time the reaction was run at about 155° F. After the delay addition period, the reactor was allowed to cool. The final emulsion contained about 30.2 percent solids, had a viscosity of about 10 cps and a pH of about 1.9, and contained a polymer having an average particle size of about 131 nm and a weight average molecular weight of about 30,000.

Gloss Determination

The effect of the polymer of Example 9 on the gloss of a paint was determined by the methodology set forth in the Gloss Determination section of Examples 1–7, supra, with one modification, namely, the binder employed was either (i) a methyl methacrylate (about 63.0 weight percent)/butyl acrylate (about 34.9 weight percent)/methacrylic acid (about 1.6 weight percent)/Sipomer WAM (about 0.5 weight percent)-containing binder or (ii) a styrene (about 55 weight percent)/butyl acrylate (about 42.1 weight percent)/methacrylic acid (about 2.5 weight percent)/Sipomer WAM (about 0.5 weight percent)-containing binder. The results are set forth in Table III below. These results also further substantiate that polymers within the scope of the present invention are capable of enhancing the gloss of a water-base paint.

Relaxation Response Determination

The percent drop in relaxation response was determined using a Wells-Brookfield Cone/Plate Model LVT viscometer. About 2 g of a paint to be tested was placed in the plate of the Wells-Brookfield viscometer. The paint-containing plate was then fitted to the viscometer cone after a torque had been applied to the cone so that the viscometer meter read 100 (full scale). The cone was then released and the percent drop in relaxation response, i.e., the percent drop in torque in a period of about 5 minutes was noted. The percent drop in relaxation response measurements are also set forth in the following Table III. These results demonstrate that polymers within the scope of the present invention are capable of dramatically enhancing the flow and leveling characteristics (as measured using a spring relaxation technique) of a water-base latex paint.

TABLE III

| Polymer of Example 9, wt % | Binder Polymeric Binder | wt % | Gloss, Percent Reflectance 60° i | 20° i[a] | Relaxation Response, Percent Drop |
|---|---|---|---|---|---|
| — | b | 100 (Control) | 76 | 36 | 11 |
| 5 | b | 95 | 75 | 35 | 15 |
| 10 | b | 90 | 81 | 45 | 60 |
| 15 | b | 85 | 81 | 45 | 61 |
| 10 | b | 90 | 80 | 39 | 61 |
| — | c | 100 (Control) | 73 | 31 | 1 |
| 10 | c | 90 | 85 | 49 | >70 |
| 10 | c | 90 | 85 | 47 | 68 |

Accordingly, the data set forth in above Table III demonstrate that polymers within the scope of the present invention are capable of enhancing the gloss and flow and leveling characteristics of a water-base paint.

Although the present invention has been described in considerable detail with reference to certain preferred versions thereof, other versions are possible. For example, the paint can include one or more other ingredients to enhance other properties of the paint. Therefore, the spirit and scope of the appended claims should not necessarily be limited to the description of the preferred versions contained herein.

What is claimed is:

1. A binder comprising water and solids, wherein about 1 to about 30 weight percent of the solid content of the binder is a polymer comprising:
   (a) about 3 to about 20 weight percent non-functional non-ionic monomer selected from the group consisting of acrylonitrile, vinyl acetate, alkenyl aromatic monomers, acrylic monomers having the formula

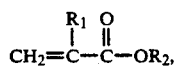

and mixtures thereof, wherein $R_1$ is selected from the group consisting of hydrogen and methyl and $R_2$ is an alkyl group comprising up to 6 carbon atoms, the polymer having a weight average molecular weight of about 15,000 to 150,000.

2. The binder of claim 1 wherein the polymer has a weight average molecular weight of about 20,000 to about 100,000.
3. The binder of claim 1 wherein the polymer has a weight average molecular weight of about 30,000 to about 60,000.
4. The binder of claim 1 wherein the polymer has a weight average molecular weight of about 15,000 to about 125,000.
5. The binder of claim 1 wherein the polymer has a weight average molecular weight of about 25,000 to about 70,000.
6. The binder of claim 1 wherein the polymer comprises about 5 to about 25 weight percent of the solid content of the binder.
7. The binder of claim 1 wherein the polymer comprises about 7 to about 20 weight percent of the solid content of the binder.
8. The binder of claim 1 wherein the polymer comprises about 8 to about 15 weight percent of the solid content of the binder.
9. The binder of claim 1 wherein the polymer further comprises a functional nonionic monomer.
10. The binder of claim 1 wherein the polymer further comprises a copolymerizable surfactant.
11. The binder of claim 1 wherein the polymer further comprises a chain transfer agent.
12. The binder of claim 1 wherein the polymer further comprises a functional nonionic monomer and a chain transfer agent.
13. The binder of claim 1 wherein the polymer further comprises functional nonionic monomer, a copolymerizable surfactant, and a chain transfer agent.
14. A latex, water-based paint comprising the binder of claim 1.
15. The binder of claim 1 wherein the polymer comprises about 5 to about 10 weight percent olefinic carboxylic acid and about 80 to about 90 weight percent non-functional non-ionic monomer.
16. The binder of claim 1 wherein the polymer has a weight average molecular weight of about 15,000 to about 125,000.
17. The binder of claim 1 wherein the polymer has a weight average molecular weight of about 15,000 to about 100,000.
18. A binder comprising water and solids, wherein about 1 to about 30 weight percent of the solid content of the binder is a polymer comprising:
   (a) about 3 to about 20 weight percent olefinic carboxylic acid; and
   (b) at least about 43 weight percent acrylic monomer having the formula

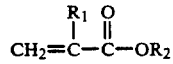

wherein $R_1$ is selected from the group consisting of hydrogen and methyl and $R_2$ is an alkyl group comprising up to 6 carbon atoms, the polymer having a weight average molecular weight of about 15,000 to about 150,000.

* * * * *